US011783408B2

(12) United States Patent
Ananthanarayana et al.

(10) Patent No.: US 11,783,408 B2
(45) Date of Patent: Oct. 10, 2023

(54) COMPUTER VISION BASED METHODS AND SYSTEMS OF UNIVERSAL FASHION ONTOLOGY FASHION RATING AND RECOMMENDATION

(71) Applicants: Rajesh Kumar Saligrama Ananthanarayana, Bengaluru (IN); Sridhar Manthani, Bengaluru (IN)

(72) Inventors: Rajesh Kumar Saligrama Ananthanarayana, Bengaluru (IN); Sridhar Manthani, Bengaluru (IN)

( * ) Notice: Subject to any disclaimer, the term of this patent is extended or adjusted under 35 U.S.C. 154(b) by 554 days.

(21) Appl. No.: 16/533,767

(22) Filed: Aug. 6, 2019

(65) Prior Publication Data
US 2020/0143454 A1 May 7, 2020

Related U.S. Application Data

(60) Provisional application No. 62/714,763, filed on Aug. 6, 2018.

(51) Int. Cl.
*G06F 16/51* (2019.01)
*G06N 20/00* (2019.01)
(Continued)

(52) U.S. Cl.
CPC .............. *G06Q 30/0643* (2013.01); *G06F 16/24578* (2019.01); *G06F 16/51* (2019.01);
(Continued)

(58) Field of Classification Search
CPC ............ G06Q 30/0643; G06F 16/51; G06F 16/24578; G06N 20/00; G06N 5/042;
(Continued)

(56) References Cited

U.S. PATENT DOCUMENTS

| | | | | |
|---|---|---|---|---|
| 2019/0147463 A1* | 5/2019 | Karmakar | .............. | G06N 20/00 705/7.31 |
| 2021/0035182 A1* | 2/2021 | Tamir-Tavor | ...... | G06Q 30/0643 |
| 2021/0224326 A1* | 7/2021 | Wang | ................. | G06Q 30/0631 |

* cited by examiner

*Primary Examiner* — Hai Tao Sun (57) ABSTRACT

In one aspect, a computerized method of computer vision based dynamic universal fashion ontology fashion rating and recommendations includes the step of receiving one or more user-uploaded digital images. The method includes the step of implementing an image classifier on the one or more user-uploaded digital images, to classify a set of user-uploaded fashion content of the one or more user-upload digital images. The method includes the step of receiving a set of fashion rules input by a domain expert. The set of rules determine a set of apparel to match with the set of user-uploaded fashion content, generating a dynamic universal fashion ontology with the image classier and a text classier. The dynamic universal fashion ontology comprises an ontology of set of mutually exclusive attribute classes. The method includes the step of using the dynamic universal fashion ontology to train a specified machine learning based fashion classifications. The method includes the step of using an active learning pipeline to keep the universal fashion ontology up-to-date. The method includes the step of using graphical representation and game theory-based algorithm for outfit generation. The method includes the step of providing an automatic outfit generator, wherein the automatic outfit generator: based on the set of user-uploaded fashion content that is output by the image classifier, matches the set of user-uploaded fashion with a ranked set of apparel suggestions that are based on the set of fashion rules and the specified machine learning based fashion classifications, wherein the automatic outfit generator implements a greedy algorithm to determine the most optimal path in the specified machine learning based fashion classifications to generate each suggested piece of apparel in the (Continued)

ranked set of apparel suggestions. The method includes the step of, based on the highest ranked suggested piece of apparel in the ranked set of apparel suggestions, generating an outfit suggestion. The method includes the step of ranking based on lifestyle parameters including but not limited to weather, brand affinity, brand popularity and novelty of style.

9 Claims, 7 Drawing Sheets

(51) Int. Cl.
  *G06V 20/20* (2022.01)
  *G06V 20/30* (2022.01)
  *G06Q 30/0601* (2023.01)
  *G06F 16/2457* (2019.01)
  *G06N 5/04* (2023.01)
  *G06K 9/62* (2022.01)
  *G06Q 50/00* (2012.01)
(52) U.S. Cl.
  CPC ............ *G06K 9/626* (2013.01); *G06K 9/6254* (2013.01); *G06K 9/6257* (2013.01); *G06N 5/042* (2013.01); *G06N 20/00* (2019.01); *G06V 20/20* (2022.01); *G06V 20/30* (2022.01); *G06Q 50/01* (2013.01)
(58) Field of Classification Search
  CPC ...... G06V 20/20; G06V 20/30; G06K 9/6254; G06K 9/6257; G06K 9/626
  USPC ....................................................... 705/27.2
  See application file for complete search history.

COMPUTER VISION BASED METHODS AND SYSTEMS OF UNIVERSAL FASHION ONTOLOGY FASHION RATING AND RECOMMENDATION

CROSS-REFERENCE TO RELATED APPLICATIONS

This application claims priority to U.S. provisional patent application No. 62/714,763, titled UNIVERSAL FASHION ONTOLOGY-BASED FASHION RATING AND RECOMMENDATION SYSTEM AND METHODS and filed on Aug. 6, 2018. This application is hereby incorporated by reference in its entirety.

BACKGROUND

Fashion is an ever-changing domain. People want to be fashionable, and it can be hard to keep up with the latest trends. Some of the trends might be applicable only to specific geographies, specific jobs, specific body shapes, specific activities/hobbies, etc. It is further noted that the concept of fashion may subjective and current computer systems are not capable of comprehending the domain. Fashion items are described in different ways in different places. A t-shirt can be called a top or t-shirt or tees. Although there are specific attributes related to each garment, there is no consensus that every fashion retailer agrees upon. Hence, categorizing a garment is very difficult. In order to solve that, fashion has to be defined in a very objective or scientific manner. Hence, there is a need for an intelligent system that provide this fashion advice information in a consumer-friendly manner.

BRIEF SUMMARY OF THE INVENTION

In one aspect, a computerized method of computer vision based dynamic universal fashion ontology fashion rating and recommendations includes the step of receiving one or more user-uploaded digital images. The method includes the step of implementing an image classifier on the one or more user-uploaded digital images, to classify a set of user-uploaded fashion content of the one or more user-upload digital images. The method includes the step of receiving a set of fashion rules input by a domain expert. The set of rules determine a set of apparel to match with the set of user-uploaded fashion content, generating a dynamic universal fashion ontology with the image classier and a text classier. The dynamic universal fashion ontology comprises an ontology of set of mutually exclusive attribute classes. The method includes the step of using the dynamic universal fashion ontology to train a specified machine learning based fashion classifications. The method includes the step of using an active learning pipeline to keep the universal fashion ontology up-to-date. The method includes the step of using graphical representation and game theory-based algorithm for outfit generation. The method includes the step of providing an automatic outfit generator, wherein the automatic outfit generator: based on the set of user-uploaded fashion content that is output by the image classifier, matches the set of user-uploaded fashion with a ranked set of apparel suggestions that are based on the set of fashion rules and the specified machine learning based fashion classifications, wherein the automatic outfit generator implements a greedy algorithm to determine the most optimal path in the specified machine learning based fashion classifications to generate each suggested piece of apparel in the ranked set of apparel suggestions. The method includes the step of, based on the highest ranked suggested piece of apparel in the ranked set of apparel suggestions, generating an outfit suggestion. The method includes the step of ranking based on lifestyle parameters including but not limited to weather, brand affinity, brand popularity and novelty of style.

BRIEF DESCRIPTION OF THE DRAWINGS

The Figures described above are a representative set and are not an exhaustive with respect to embodying the invention.

DESCRIPTION

Disclosed are a system, method, and article of computer vision based universal fashion ontology fashion rating and recommendations. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Image classification can include pattern recognition in computer vision. It can implement classification based on contextual information in digital images.

Greedy algorithm is an algorithmic paradigm that follows the problem-solving heuristic of making the locally optimal choice at each stage with the intent of finding a global optimum.

Object recognition (object classification): one or several pre-specified or learned objects or object classes can be recognized, usually together with their 2D positions in the image or 3D poses in the scene. The image data are scanned for a specific condition. An example algorithms for object recognition can be based on convolutional neural networks.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Natural language generation (NLG) is the natural language processing task of generating natural language from a machine representation system such as a knowledge base or a logical form.

Natural language processing (NLP) is a branch of artificial intelligence concerned with automated interpretation and generation of human language.

Object detection is a computer technology related to computer vision and image processing that deals with detecting instances of semantic objects of a certain class (e.g. humans, buildings, clothing items, other fashion accessories, etc.) in digital images and videos.

Ontology can encompass a representation, formal naming, and definition of the categories, properties, and relations between the concepts, data, and entities that substantiate one, many, or all domains.

Smart mirror is a device that displays a user's own image on a screen as if that screen were a mirror. A smart mirror can feature augmented reality additions to the video display and/or use an entirely virtual graphical avatar of the user.

Example Methods

Example methods use a rating score of a current style of a user. This can be done by analyzing the apparel and accessories the users are wearing. Automated suggestions can be provided on how to enhance the user's style or determine a completely different style by changing the apparels and accessories the user is wearing. Example methods can quantify style/fashion apparel, user attributes and/or a user's style/fashion enhancements for analysis. Based on these quantifications and analyses, example methods can then make style/fashion suggestions to the user.

Figure 1:
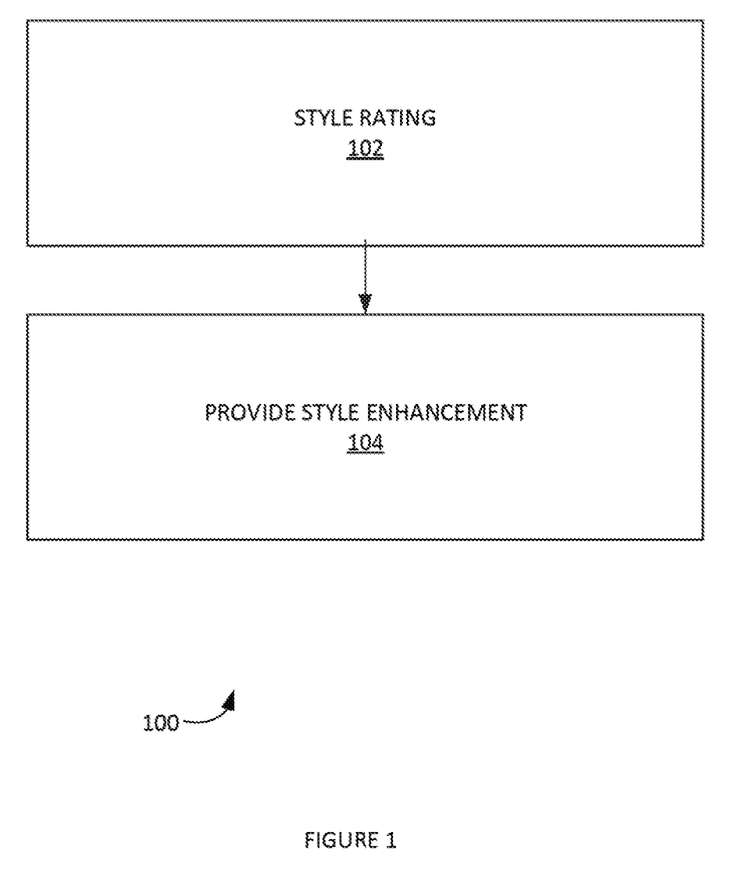
FIG. 1 illustrates an example process for providing fashion/style enhancements, according to some embodiments.

FIG. 1 illustrates an example process 100 for providing fashion/style enhancements, according to some embodiments. In step 102, process 100 can provide a style rating. As has been noted, style and fashion can be in constant flux. Process 100 can track the trends and various environmental factors related to fashion. Based on this input, process 100 can provide a rating of the style of a user.

In step 104, process 100 can provide style enhancements. Process 100 can suggest changes to the existing set of apparel and accessories of a user in order to improve the user's style. Process 100 can take fashion trends and other social/environmental factors (e.g. a user physical-body measurement, etc.) into consideration. Process 100 can generate fashion suggestions accordingly. Process 100 can provide said suggestions in natural language so that users can understand.

Figure 2A:
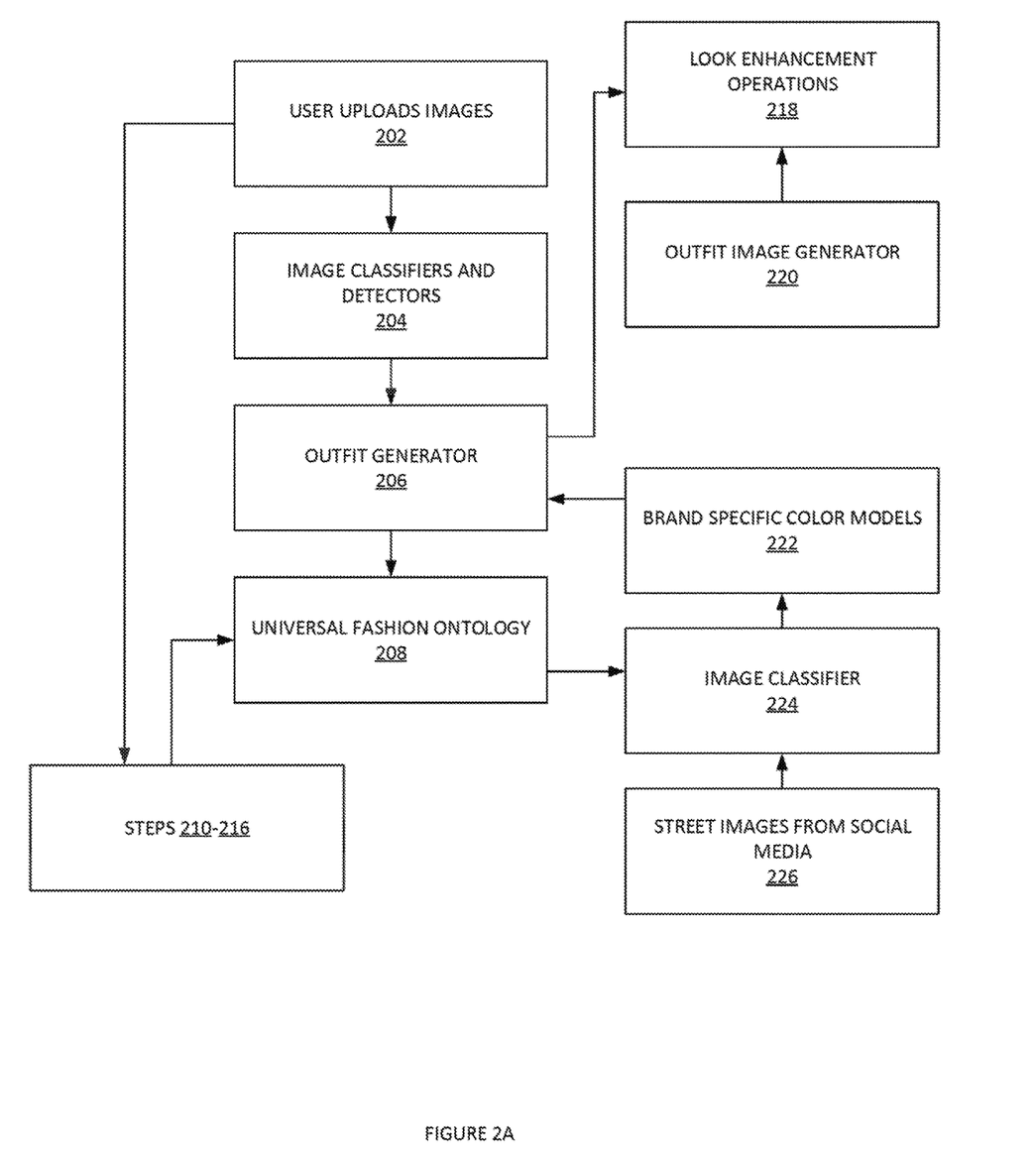
FIGS. 2A-B illustrate an example process for universal fashion ontology-based fashion recommendation, according to some embodiments.
Figure 2B:
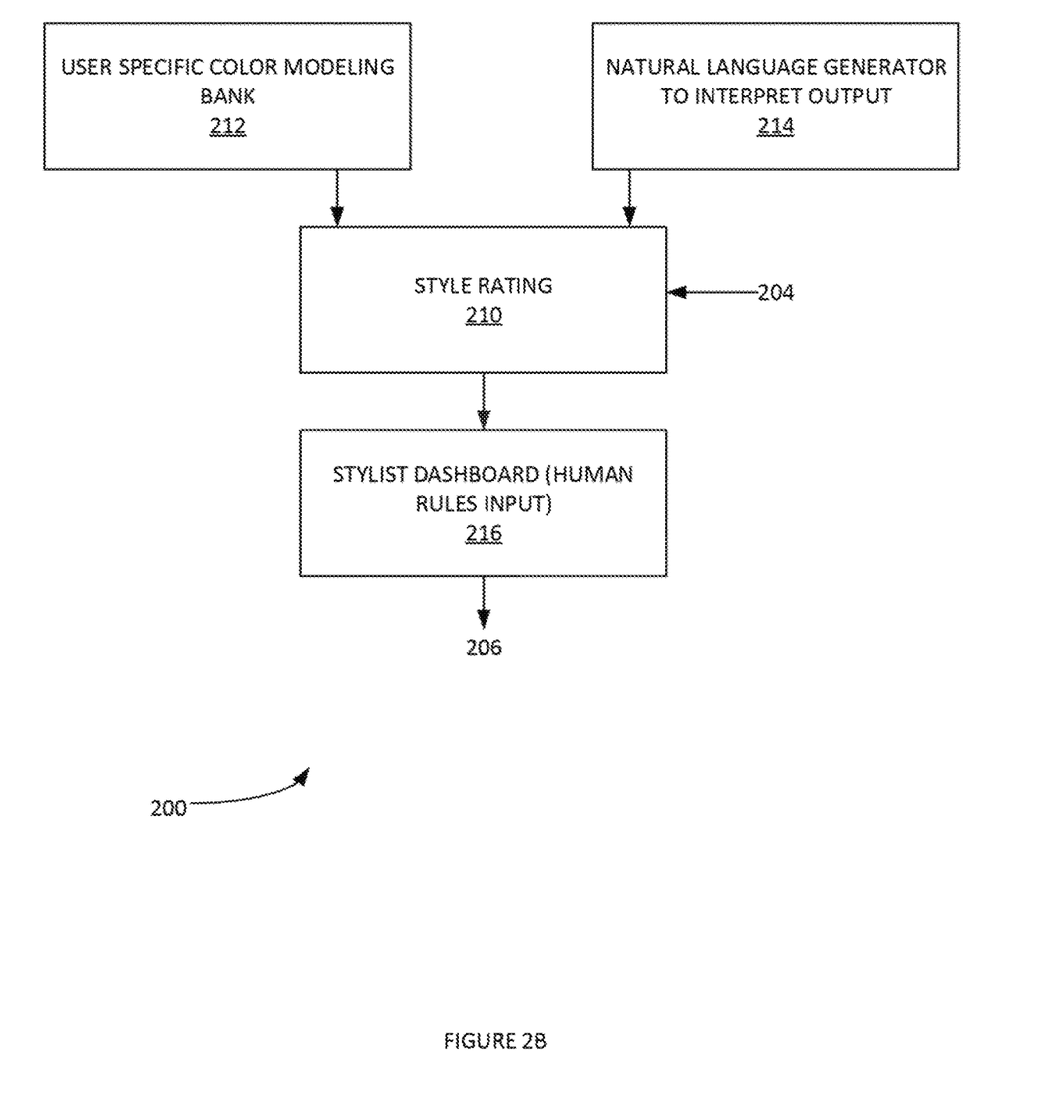

FIGS. 2A-B illustrate an example process 200 for universal fashion ontology-based fashion recommendation, according to some embodiments. In step 202, process 200 can obtain one or more user-uploaded digital images. In step 204, process 200 can implement image classifier(s) and detector(s).

In step 206, process 200 can implement an outfit generator 206. Process 200 can combine the rules inputted by the domain experts and/or color models to generate outfits on different sets of apparels. These sets can be from, inter alia: digital wardrobes of people, catalogues of fashion stores and clothing from fashion brands, etc. The outfit generator 206 can also apply concepts of graph theory and game theory to implement a greedy algorithm to find the most optimal path to generate an outfit (e.g. see FIG. 5 infra). The outfits generated can be ensured to be unique, aesthetically pleasant and keep the trends in view. Outfit generator 206 can leverage outfit image generator 220 to provide a user-look enhancement via look-enhancement operations (e.g. see infra, etc.).

Process 200 can generate and maintain a universal fashion ontology 208. With universal fashion ontology 208, process 200 can combine the data from across the web and organize it in such a way that an attribute class always has mutually exclusive values. This type of ontology creation is used for machine learning based fashion classification. This gives an overall boost in the accuracy of the models. Since the values are all mutually exclusive, the system is able easily distinguish between each product and hence provide very accurate results.

The universal fashion ontology 208 can be a dynamic ontology. It is noted that fashion is an ever-changing domain, new styles are being created every few weeks. Hence, the ontology can be a dynamic ontology. The ontology can change in its structure and content on a specified periodic basis (e.g. daily, weekly, etc.). In the case of a dynamic ontology, process 200 can also periodically update the relevant image classifiers and any expert systems. Process 200 can also update any applicable tags/attribute values associated with the products as well.

In steps 210-216, process 200 can obtain a style rating and have said style rating 214 filtered through an expert system such as a stylist dashboard 216. Style rating 214 can, given an image of a person, provide a relevant style rating. Style rating 214 can obtain data from user specific color modeling bank 210 and user specific style model bank. Process 200 can use the image classification systems and object detection systems to identify various fashion objects and figure out the attributes. Once it has identified these, process 200 considers the conformance of base rules specified by specialists (e.g. fashion stylists, etc.) and also checks the color combination used. Process 200 can also consider user-body shape and determine if the overall outfit is aesthetically good on the person. Process 200 determine the various attributes of the products and checks if they are a good match for the user's body shape. Body shape personalization can also be provided in the form of rules by experts in step 216. Part of this personalization is also taken by analysing numerous images available in social media and videos. The output of steps 210-216 can be provided to universal fashion ontology 208.

Process 200 constantly analyses user uploaded images and social media images. If the image classifiers are not able to classify certain objects accurately, it can be sent for human curation. During human curation, if new values are found, they can be updated in the universal fashion ontology. Universal fashion ontology 208 can be provided to image classifier 224. Image classifier 224 is trained on new set of images curated by humans (fashion experts). These images would be representative images of the product attributes present in universal fashion ontology 208. Image classifier 224 can obtain image(s) from social networks in step 226.

Image classifiers for street images are now discussed. Human rules and color models can be used to obtain a basic apparel combinations. Rules and color models can consider trends, geographies and/or special occasions. Rules and color models can also consider the nuances of styling which differs from person to person. Process 200 can be personalized and can understand and cater to each individual styling sensibility. Process 200 adopts a method called graded personalization. In this, the system gives better recommendations with more user data. The system is initialized with gender and geography. As the user starts interacting with the system, user behavior and user's personal information are taken into consideration to give more personalized recommendations. Accordingly, process 200 can take input from users in the form of images of styles that inspire them. Process 200 can analyze and understand these images from a fashion perspective them. Image classifiers for street images are programmed in such a way that they can clearly distinguish the fashion objects and non-fashion objects. They can identify different apparels and fashion accessories in the image and label them with their finer details. The fashion perspective comes in the labelling of apparel/accessory attributes. It ignores the other objects and focusses on the fashion objects in the image. For example, Process 200 image classifiers can detect a V-neck half sleeves shirt in a random street image while other classifiers might detect a car or lamp post or in general a person. It can also detect the same in any random indoor or outdoor backgrounds. Process 200 can detect fashion objects, such as, inter alia: apparels and accessories present in the image. Process 200 can identify different attributes of each object detected. Process 200 can recognize the combination and make a model that connects these objects and attributes. With this capability, process 200 can apply specific style rules and color models to satisfy each user/fashion brand.

Brand specific color models 222 can be generated from image classifier 224. In turn, brand specific color models 222 can be used by outfit generator 206.

Process 200 can also leverage online celebrity, brand, geolocation, scene images and occasion sensitive style ratings as well. Process 200 can also consider celebrities (e.g. celebrity styles, endorsements, etc.). Process 200 can use certain third-party libraries to recognize celebrities, background scene and geographic region. Combining these with the occasion such casual, formal or party event etc., process 200 then rates the style appropriately. For example, if a person uploads a digital image of himself/herself wearing a formal suit for a hiking event with mountainous background, process 200 can provide a poor rating as opposed to formal suit for interview in a board room background. In another example, if a person uploads an image wherein she is wearing a skirt with a biker jacket as opposed to denim jeans, the system suggests the change from skirt to denim jeans. In another example, if a person is combining a red t-shirt with a red trouser, the system suggests a better color combination so that it looks good aesthetically. In another example, if a person is wearing a floral print top with a floral print skirt, the system suggests a better combination since the combination is technically (in styling terms) called a print clash and such combinations are known to look bad. In another example, if a person is wearing slippers with formal trousers, the system can suggest boots/formal footwear.

Process 200 can be used to enhance a user's fashion 'look'. Process 200 can rate the outfit worn by a person. Process 200 can also suggest a set of fashion items to change in the outfit in order to improve it. Process 200 can mark the fashion apparel accessory that is to be changed or added to enhance the look. Process 200 uses the style rating component 210 and later sends individual fashion objects to the outfitter component 206 to generate a 'good' outfit (e.g. as quantified by a specified rating/score value, etc.). In addition to these fashion objects, outfit generator 206 is provided an online catalog and/or the full wardrobe of the user who uploaded the image. When the outfit generator 206 generates a better outfit, the missing objects are provided as enhancements. The outfit generator ensures variation in the list of outfits generated so that similar looks are not generated. The outfit generator considers additional personal information of users to generate relevant outfits (graded personalization). It is also programmed to generate outlier outfits which may not comply with user's current preferences but would be highly probable that user might like. These outlier outfits may be influenced by a social media trend or latest buying pattern of user's segment.

In this way, the user can enhance his/her style by replacing specified fashion components and/or by adding new fashion components. For example, a user can upload an image of the user wearing a t-shirt and denim jeans, process 200 can then suggest a jacket or belt or boots to enhance the user's fashion look.

Interpretability and presentation AI systems are now discussed. Process 200 can utilize interpretability and presentation AI systems. For example, process 200 can use interpretability and presentation AI systems to provide/ specify and natural language "why" a certain output is given. Process 200 can spell out the reason as to why a particular outfit was chosen and a particular outfit was rated in a certain way in human readable natural language. This feature provides interpretability to the system. It can also enable/assist system developers to debug the system. While debugging, AI developers can add more data to address any data bias/class imbalance or they can modify the rules that would have influenced the output in a wrong way.

Presentation of the output can help the user needs to appreciate the styling and the aesthetic sense of the apparel combination in the best possible way. As noted, process 200 can use an outfit image generator 220. Outfit image generator 220 can automatically create a collage that contains all the products that the outfit is made of. There are multiple types of collage images that can be generated based on the type of garment and number of apparels/accessories present in the outfit. Process 200 also includes a capability of generating images where the apparel combination is draped on multiple virtual human models.

Process 200 can provide multiple interfaces. Process 200 can work across multiple interfaces. In this way, users can access the system using smart mirrors, messenger chatbots/ interactive agents, mobile applications, websites, etc. Since the system is built with the software-as-a-service model, it can be used across various platforms and devices. In step 222, process 200 can implement brand specific color models. Color models can be combinations of apparels that represent good color combinations. While human rules can be used to filter attributes and refine the search space, human rules may not be applied for colors and color palettes. Adding such color rules are also impractical due to the wide diversity of colors. Also, each person/fashion brand has a different sense of color combination. It is not possible to capture this diversity via rules. Hence, color models are implemented in process 200.

In step 218, process 200 can implement a stylist dashboard. The stylist dashboard can obtain human rules input. The aesthetic sense in fashion domain be obtained via step 218. Finding the right outfit is like finding needle-in-the-haystack problem since the potential combinations are enormous. Human rules can be used to augmented and/or to limit the dataset of fashion images and/or provide a pre-set range of fashion attributes. By applying these rules as filters, the process 200 can search a smaller subset of data. This dataset can be further refined using machine learning to obtain a desired fashion combination.

It is noted that fashion is a lifestyle domain. Every aspect of life can influence fashion. Hence, process 200 provides a scoring algorithm that uses a combination of the following based on the information provided in the input:

Color combinations can be used by process 200 as part of the combination. A group of experts (stylists) can be used to select a bunch of outfits in which the color combinations are perfect. This set of outfits called model outfits form a color bank. This set is continuously updated by said experts with help of web crawlers that bring in images of celebrities/ fashion icons from across the world.

Style combinations can be used by process 200 as part of the combination. This is a derivative of various style rules created by the panel of experts. Also, these rules can be auto-generated by reviewing social media images of fashion icons. An example rule can be: "DO NOT PAIR sleeveless jacket and a sleeveless top".

Number of products used can be used by process 200 as part of the combination. An outfit can have multiple products. If the outfit given for evaluation has very few objects. Adding a few more products would increase the score. For example, wearing a scarf might change the look completely. Or wearing a tie or a hat or adding a small accessory like an earring or necklace etc.

Novelty of Product used can be used by process 200 as part of the combination. Based on specified web crawlers on various internet sites, process 200 can locate and obtain popular combinations. For example, trench coats can be rare in some geographies than others. Or wearing an Indian ethnic saree in western country is country novel to that region. Process 200 can statistically arrive at the novelty score of the products worn.

Novelty of Style/Combination can be used by process 200 as part of the combination. Process 200 uses geolocation to identify nuances in styling per region. For example, camisole tops with mini-skirts are more popular in Russia than in United Kingdom. While, slogan tees with mini-skirts are more popular in the United Kingdom than in Russia. If a style is more popular in the region, process 200 gives a lesser score Body type can be used by process 200 as part of the combination. Process 200 also considers body type and judge whether the products being worn are ideal based on the rules written by panel of experts (e.g. which is constantly updated in the system).

Occasion can be used by process 200 as part of the combination. If the occasion/activity is provided as an input, process 200 can understand if the products are appropriate for that occasion/activity such as business meetings, hiking, etc.

Celebrity and brands can be used by process 200 as part of the combination. Using some third-party libraries, process 200 can identify celebrities and brands. The system keeps track of the popularity of celebrities and brands in social media/news etc. If the outfit matches popular celebs/brand looks, it gives a higher score. Higher the popularity, higher the score.

Scene analysis can be used by process 200 as part of the combination. The third-party systems also provide the scene in which the photo was taken (e.g. restaurant, beach, living room etc.). Process 200 considers the scene and rates whether the worn outfit is appropriate for the scene.

Weather can be used by process 200 as part of the combination. If the geolocation is given, the system queries a third-party weather API and gives a score if the outfit is appropriate for that particular day.

Process 200 uses these to determine outfits of the highest quality (e.g. highest score Process 200 is used to give a rating for a combination of products. Process 200 is built to accommodate more lifestyle inputs and update the rating algorithm accordingly.

Example Systems

Figure 3:
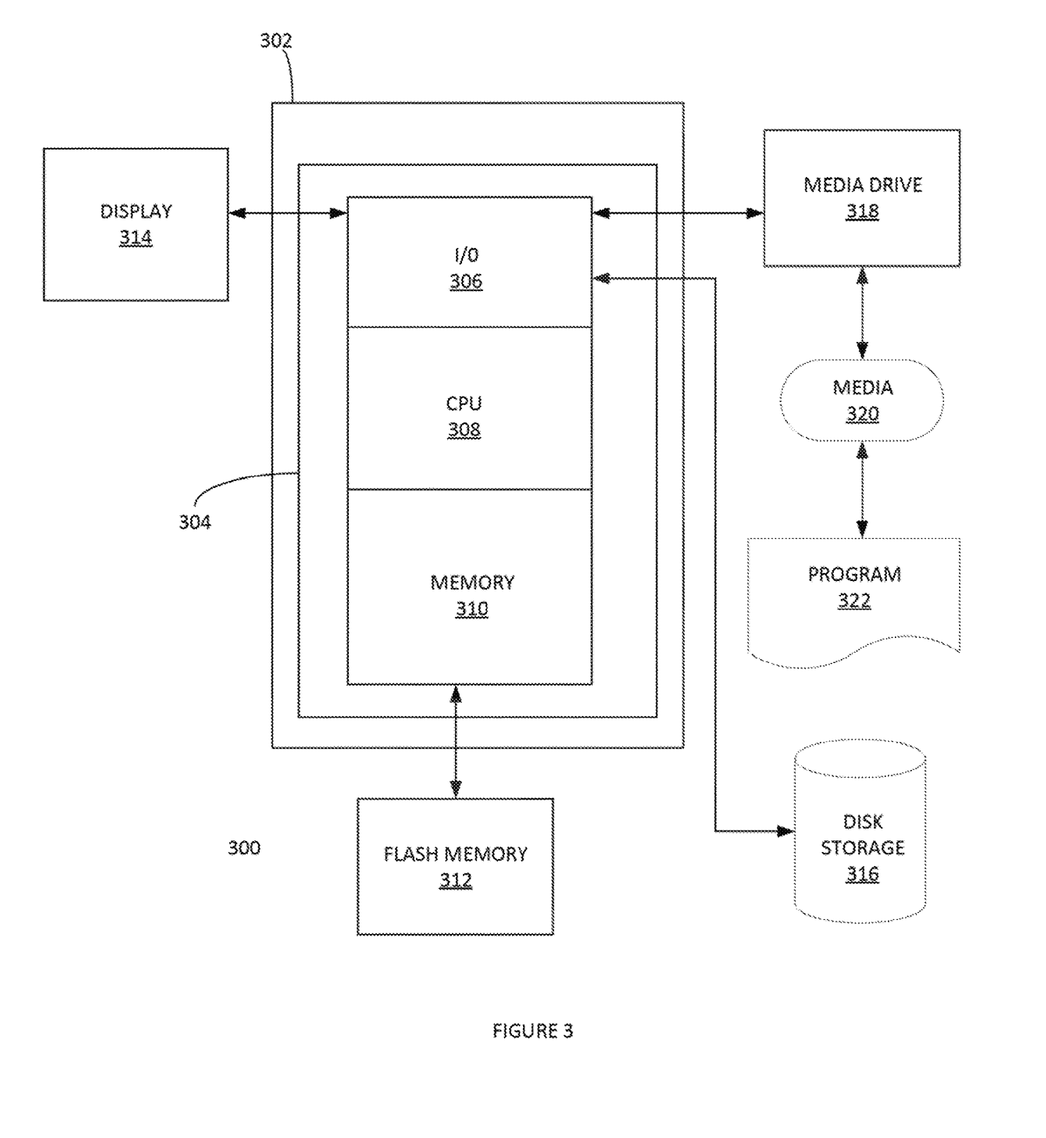
FIG. 3 depicts an exemplary computing system that can be configured to perform any one of the processes provided herein.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 4:
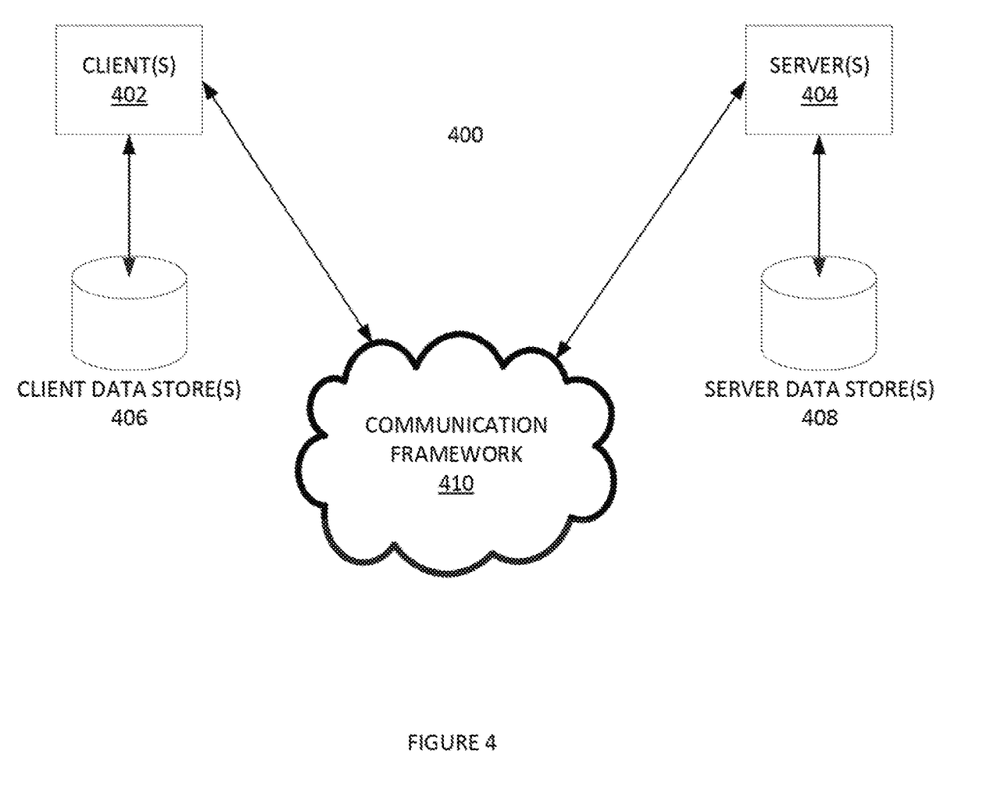
FIG. 4 is a block diagram of a sample computing environment that can be utilized to implement various embodiments.

FIG. 4 is a block diagram of a sample computing environment 400 that can be utilized to implement various embodiments. The system 400 further illustrates a system that includes one or more client(s) 402. The client(s) 402 can be hardware and/or software (e.g., threads, processes, computing devices). The system 400 also includes one or more server(s) 404. The server(s) 404 can also be hardware and/or software (e.g., threads, processes, computing devices). One possible communication between a client 402 and a server 404 may be in the form of a data packet adapted to be transmitted between two or more computer processes. The system 400 includes an orchestration framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404. In some embodiments, system 400 can instead be a collection of remote computing services constituting a cloud-computing platform.

Additional Methods

Figure 5:
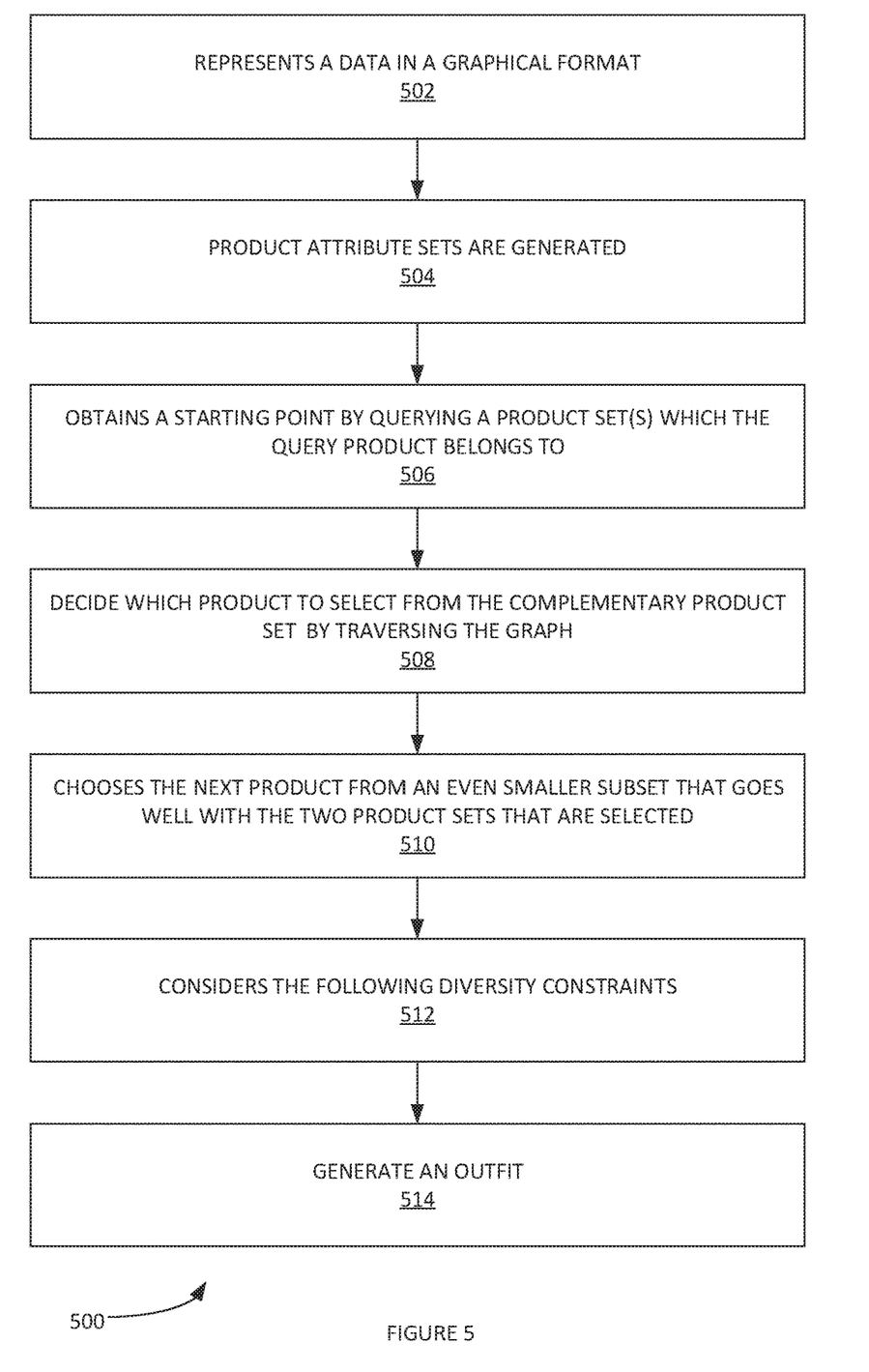
FIG. 5 illustrates an example process for traversing a graph that is created using a fashion domain specific language with an adjacency list, according to some embodiments.

FIG. 5 illustrates an example process 500 for traversing a graph that is created using a fashion domain specific language with an adjacency list, according to some embodiments. From a graph theory perspective, in step 502, process 500 represents a data (e.g. fashion product data) in a graphical format.

In step 504, the product attribute sets are generated. A product attribute set is combination of attributes that when put together represents set of products (e.g. half sleeve shirts–shirt+sleeve_length–half, etc.). Each product attribute set is a node that can have two types of edges representing whether it can be either paired or not paired with other attribute sets. A node of the graph can have multiple edges.

In step 506, when creating an outfit, process 500 obtains a starting point (e.g. query product set—set(s) which the query product belongs to, etc.). Process 500 has to then decide which product to select from the complementary product set by traversing the graph in step 508. At this point, process searches at only a small subset of products to choose from instead of looking at the entire product set. In step 510, once it finds two products, process 500 chooses the next product from an even smaller subset that goes well with the two product sets that are selected. The path taken by the algorithm depends on the previous node selected.

It is noted that, in a game theory context, the goal of the game is to create an outfit which is not previously created and also ensure it is aesthetically good. Each outfitter run (e.g. attempt by process 500 to generate an outfit) is a player. The rules of game are the restrictions or diversity constraints. Every time a player chooses a path, the next player cannot choose the same path again and, hence, has to try to find a different path to reach the same goal. If a player is not able to reach the goal (e.g. cannot get a complete outfit) then product sets can be expanded which reduces the quality of the outfit. In this way, the game is optimized to generate as many unique aesthetically good-looking outfits as possible.

Process 500 considers the following diversity constraints, inter alia in step 512.

Product category diversity (e.g. category associations) is used as a diversity constraint. This ensures that same product categories are not paired. For example, if one path gives shirts and trousers. Then, the path between the product sets (shirts and trousers) is given a lower score. This ensures the next outfit would have shorts with shirts.

Color diversity is used as a diversity constraint. The graph traversal engine ensures different color models are chosen by applying a negative feedback to used color model.

Geography/lifestyle customization is used as a diversity constraint. There can be specific labels associated to certain paths to enable graded personalization.

In this way, process 500 creates a graph using a fashion domain specific language with an adjacency list. Process 500 can be used by human stylists to define product styles that can go well together and those which do not go together. This input is taken into rule engine which is a graph parsing system that can evaluate the most optimal cloth pairing. The language allows stylists to express the product correlation using various physical and aesthetic attributes such hemlines, necklines, sleeves etc. This adjacency list (e.g. includes a set product attribute pairing(s)) can be created automatically by parsing an image where individual product attributes are extracted using classifiers. These images can be from social media or any channel.

In step 514, process 500 can generate an outfit. An outfit is a combination of two or more different products—a topwear (shirt), bottomwear (pant), outerwear (jacket), footwear (boots), accessories (watch) and headgear (hat). Step 506 is implemented by reducing the overall search space to smaller product sets using the graphical representation and specified game theory concepts to obtain the best outfits.

Example language for implementing process 500 is now discussed.

DO NOT PAIR—Shirts+Hemline Shape–Dolphin, Handkerchief, V, Diagonal, Tulip, Round, Other Asymmetric WITH Trousers+Hemline shape–Dolphin, Handkerchief, V, Diagonal, Other Asymmetric, Tulip, Round, Other Asymmetric Do Not Pair Shirts having (hemline_shape is diagonal,dolphin,handkerchietother-asymmetric,round,tulip,v) with Trousers having (hemline_shape is diagonal,dolphin, handkerchietother-asymmetric,round,tulip,v)

DO NOT PAIR—Shirts+Hemline Width–Wide, Extra Wide WITH Trousers+Hemline Width–Wide, Extra Wide Do Not Pair Shirts having (hemline_width is extra wide with Trousers having (hemline_width is extra-wide,wide)

PAIR—Shirts+Hemline Width–Wide, Extra Wide WITH Trousers+Hemline Width–Narrow, Fitted, Regular Pair Shirts having (hemline_width is extra-wide,wide) with Trousers having (hemline_width is fitted,narrow,regular)

PAIR—Shirts+Hemline length–Waist WITH Jeans+waist rise–All (EXCEPT High) Pair Shirts having (hemline_length is waist) with Jeans having (waist_rise is not high)

PAIR—Shirts+Hemline Length–Waist WITH Trousers+Waist Type–All (EXCEPT Paper bag) Pair Shirts having (hemline_length is waist) with Trousers having (waist_type is not paper-bag)

PAIR—Shirts+Hemline Length–Below Waist, Hip WITH Trousers+Waist Type–Bandless, Waistband OR Waist Type–Paper Bag Pair Shirts having (hemline_length is below-waist,hip) with Trousers having (waist_type is bandless, paper-bag,waistband)

PAIR—Shirts+Hemline Length–Below Waist, Hip WITH Trousers+Waist Type–Bandless, Waistband OR Waist Type–Paper Bag OR Waist Type–Bandless, (NOT Paper Bag) Pair Shirts having (hemline_length is below-waist,hip) with Trousers having (waist_type is bandless,paper-bag,waistband) or (waist_type is bandless and not paper-bag)

PAIR—Shirts+Hemline Length–Below Waist, Hip WITH Trousers+Waist Type–Bandless, Waistband OR Waist Type–Paper Bag*Waistband Pair Shirts having (hemline_length is below-waist,hip) with Trousers having (waist_type is bandless,waistband)

PAIR—Shirts+Hemline Length–Below Waist, Hip WITH Trousers+Waist Type–Bandless, Waistband OR Waist Type–Waistband, (NOT Paper Bag) OR Waist Type–Paper Bag OR Waist Type–Bandless, (NOT Paper Bag) Pair Shirts having (hemline_length is below-waist,hip) with Trousers having (waist_type is bandless,paper-bag,waistband) or waist_type is bandless,waistband and not paper-bag)

Universal fashion ontology is now discussed. A universal fashion ontology is created by a combination of multiple text and image classifiers. Universal fashion ontology refers to an ontology that can be used to classify all the fashion products in the world (e.g. regardless of the geography in which it is produced/used). It is noted that in fashion industry, there is a lack of standardized terminology and hence each brand describes its product in a different way. However, even if the descriptions differ, they all appear the same visually.

A universal fashion ontology is created by taking a seed ontology built by experts in the fashion domain. The universal fashion ontology is built with fashion fundamentals/essentials into consideration. The universal fashion ontology contains list of attributes that are parts of a garment like sleeve length, hemline length etc. The universal fashion ontology also contains list of attributes that are intangibles, those which exemplify the visual appeal of the garment like girly, nerdy etc.

Once the base structure is done, expert data taggers gather various images for each attribute value. Using supervised learning/deep learning techniques, specific ML models are created to predict these values given any garment image. These ML models can initially run a detector to locate fashion objects in an image and later run classifiers on those objects.

These ML models are used on numerous images from websites around the world obtained from the generic fashion website scraper built in-house. While scraping these websites, if the system encounters a description of a product which conflicts with the predicted value of the product attribute, it is sent to a review process.

Figure 6:
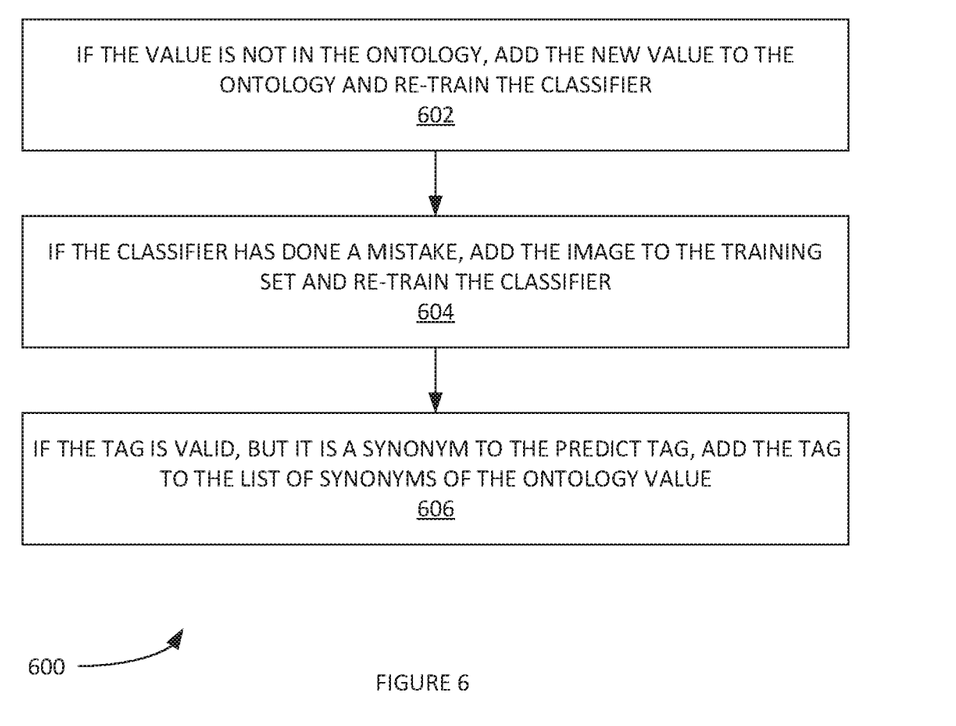
FIG. 6 illustrates an example process 600 for product which conflicts with the predicted value of the product attribute, according to some embodiments.

FIG. 6 illustrates an example process 600 for product which conflicts with the predicted value of the product attribute, according to some embodiments. Three example resolutions to this conflict are now discussed. The process can determine that a tag present in the website is wrong, hence discard the new value. The tag is valid and its wrongly predicted by our classifiers because of the following examples. If the value is not in the ontology, in step 602, process 600 can add the new value to the ontology and re-train the classifier. If the classifier has done a mistake, in step 604, process 600 can add the image to the training set and re-train the classifier. If the tag is valid, but it is a synonym to the predict tag, in step 606, process 600 can add the tag to the list of synonyms of the ontology value.

Since there are numerous (e.g. seventy) attributes for a garment, the ML models cannot be maintained to be up-to-date manually on a constant basis. In this way, a Classifier Active Learning Management (CALM) tool is built with active learning pipeline. This tool ensures that the models are auto-trained and new models are built and deployed by the fashion experts without involvement of data scientists. This way, universal fashion ontology is kept up-to-date and relevant in the ever-changing fashion world.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a

What is claimed as new and desired to be protected by Letters Patent of the United States is:

1. A computerized method of computer vision based dynamic universal fashion ontology fashion rating and recommendations comprising:
   receiving one or more user-uploaded digital images;
   implementing an image classifier on the one or more user-uploaded digital images, to classify a set of user-uploaded fashion content of the one or more user-upload digital images;
   receiving a set of fashion rules input by a domain expert, wherein the set of rules determine a set of apparel to match with the set of user-uploaded fashion content,
   generating a dynamic universal fashion ontology with the image classier and a text classier, wherein the dynamic universal fashion ontology comprises an ontology of set of mutually exclusive attribute classes;
   using the dynamic universal fashion ontology to train a specified machine learning based fashion classifications;
   using an active learning pipeline to keep the universal fashion ontology up-to-date;
   using graphical representation and game theory-based algorithm for outfit generation;

providing an automatic outfit generator, wherein the automatic outfit generator:
  based on the set of user-uploaded fashion content that is output by the image classifier, matches the set of user-uploaded fashion with a ranked set of apparel suggestions that are based on the set of fashion rules and the specified machine learning based fashion classifications, wherein the automatic outfit generator implements a greedy algorithm to determine the most optimal path in the specified machine learning based fashion classifications to generate each suggested piece of apparel in the ranked set of apparel suggestions; and
  based on the highest ranked suggested piece of apparel in the ranked set of apparel suggestions, generating an outfit suggestion; and
  ranking based on lifestyle parameters including but not limited to weather, brand affinity, brand popularity and novelty of style.

2. The method of claim 1, wherein the set of apparel suggestions comprises a digital wardrobe outfit, a catalogues of a fashion store or a set of clothing from a fashion brand.

3. The method of claim 2, wherein the image classier generates a set of brand-specific color models that are included in the dynamic universal fashion ontology.

4. The method of claim 3 further comprising:
  implementing the automatic outfit generator within a smart mirror system.

5. The method of claim 4, wherein a dynamic universal fashion ontology structure and a dynamic universal fashion ontology content is updated on a specified periodic basis.

6. The method of claim 5, wherein the specified periodic bases is a weekly basis.

7. The method of claim 5, wherein the image classifier of the dynamic universal fashion ontology and any set of suggested content from a domain expert system of the dynamic universal fashion ontology is periodically updated.

8. The method of claim 7, wherein the domain expert comprises a fashion expert.

9. The method of claim 8, wherein the automatic outfit generator determines a user body shape and utilizes the user body type to rank set of apparel suggestions.

* * * * *